United States Patent
Dumont et al.

(10) Patent No.: US 11,361,061 B2
(45) Date of Patent: Jun. 14, 2022

(54) BIOMETRIC INSPECTION DEVICE WITH INTEGRITY VERIFICATION, AND AN ASSOCIATED METHOD

(71) Applicant: IDEMIA IDENTITY & SECURITY FRANCE, Courbevoie (FR)

(72) Inventors: Denis Dumont, Courbevoie (FR); Olivier Poitelon, Courbevoie (FR)

(73) Assignee: IDEMIA IDENTITY & SECURITY FRANCE, Courbevoie (FR)

(*) Notice: Subject to any disclaimer, the term of this patent is extended or adjusted under 35 U.S.C. 154(b) by 0 days.

(21) Appl. No.: 17/108,291

(22) Filed: Dec. 1, 2020

(65) Prior Publication Data

US 2021/0165864 A1    Jun. 3, 2021

(30) Foreign Application Priority Data

Dec. 3, 2019   (FR) ...................... 1913657

(51) Int. Cl.
*G06V 40/13*    (2022.01)
*G06F 21/32*    (2013.01)
*G06F 21/87*    (2013.01)
*G06V 40/12*    (2022.01)

(52) U.S. Cl.
CPC .............. *G06F 21/32* (2013.01); *G06F 21/87* (2013.01); *G06V 40/1324* (2022.01); *G06V 40/1365* (2022.01)

(58) Field of Classification Search
None
See application file for complete search history.

(56) References Cited

U.S. PATENT DOCUMENTS

| | | | |
|---|---|---|---|
| 9,147,324 B2* | 9/2015 | Lin | G07F 19/207 |
| 2005/0039040 A1* | 2/2005 | Ransom | G01R 22/066 726/6 |
| 2005/0271258 A1* | 12/2005 | Rowe | G06K 9/2018 382/124 |
| 2007/0138250 A1 | 6/2007 | Clark | |
| 2019/0005268 A1* | 1/2019 | Gupta | G06K 19/06037 |

FOREIGN PATENT DOCUMENTS

EP    2175396 A2    4/2010

* cited by examiner

*Primary Examiner* — Joseph R Haley
(74) *Attorney, Agent, or Firm* — Muncy, Geissler, Olds & Lowe, PC

(57) ABSTRACT

A biometric inspection device including a housing provided with an acquisition interface, the device including an optical sensor for acquiring at least one image of a portion of the body of a candidate for inspection appearing before the acquisition interface. The optical sensor is configured so that the image also covers an internal zone of the housing situated outside the acquisition interface.

15 Claims, 2 Drawing Sheets

[Fig. 1a]
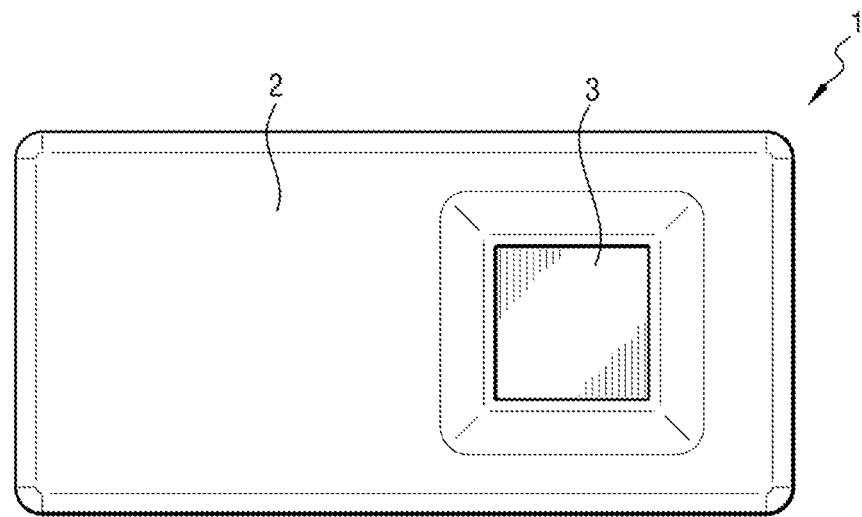
[Fig. 1b]
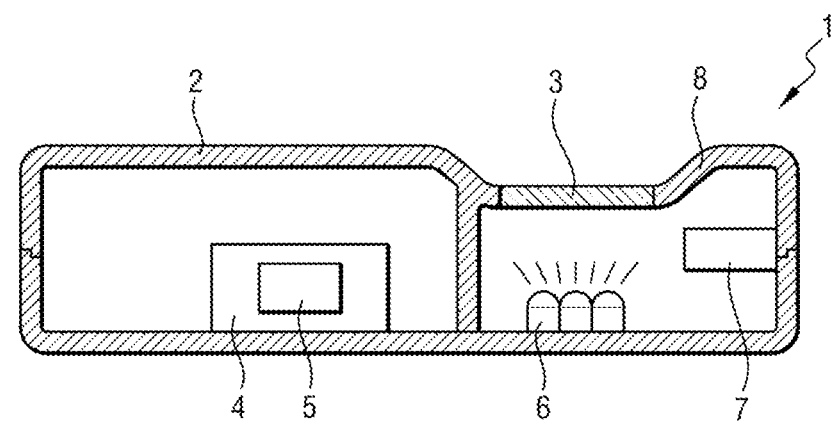

[Fig. 2]
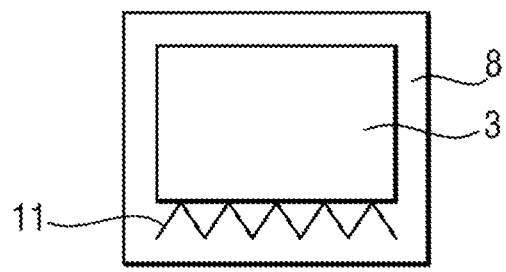
[Fig. 3]
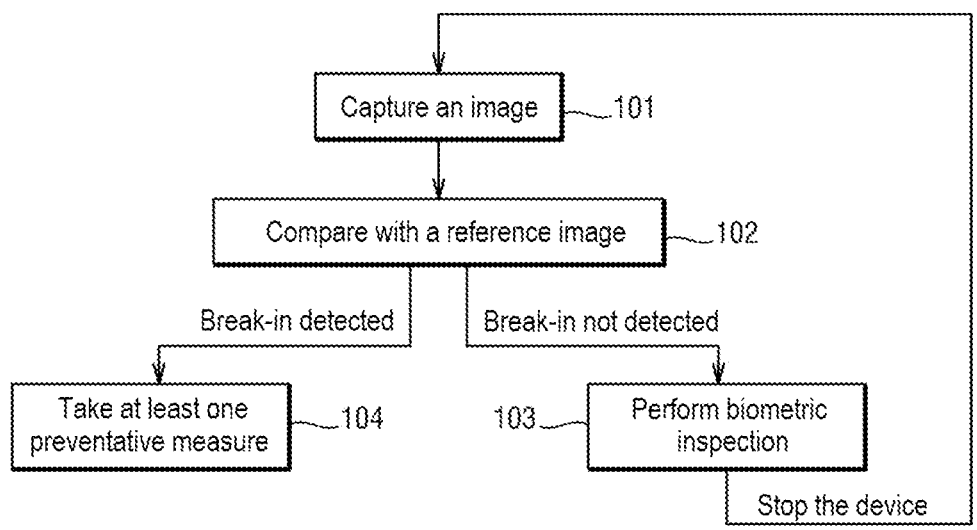
[Fig. 4]
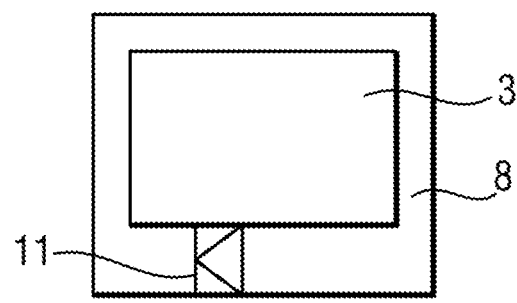

BIOMETRIC INSPECTION DEVICE WITH INTEGRITY VERIFICATION, AND AN ASSOCIATED METHOD

The present invention relates to the field of biometric recognition, e.g. for the purposes of identifying an individual or of verifying that an individual is entitled to access premises, an object, or information.

BACKGROUND OF THE INVENTION

Usually, in order to validate or refuse recognition, a biometric recognition method consists in extracting biometric data from an image that has been captured of a portion of the body of a candidate for recognition, and comparing it with reference biometric data extracted from a reference image of the same portion of a user's body.

To this end, use is generally made of a biometric inspection device having a housing that is provided both with an interface on which the candidate applies a finger, and also with a camera arranged inside the housing to take one or more images of said finger in order to launch the biometric inspection method.

Unfortunately, it can happen that dishonest people gain access to the sensing elements of the biometric inspection device by breaking into the housing at its interface, which is a zone that is mechanically weaker than the remainder of the housing.

There therefore exists a need to detect such a break-in automatically. Proposals have thus been made to arrange switches inside the housing: in the event of the housing being broken into, the power supply to the switches is immediately interrupted, thereby enabling the device to detect the fraud automatically.

The drawback of that type of system is that it requires the switches to be powered permanently.

OBJECT OF THE INVENTION

An object of the invention is to provide a biometric inspection device with monitored integrity that consumes less energy.

Another object of the invention is to provide a method of verifying the integrity of such a device.

SUMMARY OF THE INVENTION

In order to achieve this object, the invention provides a biometric inspection device comprising a housing provided with an acquisition interface, the device including an optical sensor for acquiring at least one image of a portion of the body of a candidate for inspection appearing before the acquisition interface.

According to the invention, the optical sensor is configured so that said image also covers an internal zone of the housing situated outside the acquisition interface.

Thus, by using the optical sensor, it is possible to see whether the internal zone of the housing present in the acquired image has been altered, and in particular damaged and/or opened, which would indicate there has been a break-in.

For the purpose of monitoring the integrity of the device for performing biometric recognition, the invention relies advantageously on the optical sensor that is already present in said device. This avoids using additional elements as in the prior art, which additional elements are also expensive in terms of energy.

The term "acquisition interface" is used to mean the portion of the housing with which a candidate for biometric inspection interacts in order to take an image of a portion of the candidate's body. It should thus be understood that the acquisition interface does not include an outside surface of the housing on which a candidate might for example rest a hand in order to manipulate the housing without the optical sensor being able to acquire an image of said hand while it is in that position relative to the housing. Given that the internal zone is not visible from outside the housing, the internal zone does not form part of the acquisition interface.

Optionally, the acquisition interface is an acquisition prism.

Optionally, the internal zone surrounds at least a portion of the acquisition interface.

Optionally, the internal zone surrounds the acquisition interface entirely.

Optionally, the internal zone includes at least a portion of a margin for fastening the acquisition interface to the housing.

Optionally, the optical sensor is a camera.

Optionally, the device is a device for inspecting fingers.

Optionally, the device further includes at least one integrity indicator for indicating the integrity of the housing.

Optionally, the integrity indicator is arranged in the internal zone.

Optionally, the integrity indicator forms a particular pattern and/or includes a particular pattern.

Optionally, the integrity indicator is an integrity weld.

Optionally, the integrity indicator presents an end that is stamped.

The invention also provides a method of verifying the integrity of a device as described above, including the step of comparing a reference image with an image acquired by the optical sensor in order to check the integrity of the device.

Optionally, an image for comparing with the reference image is acquired each time the device is started.

Optionally, if a break-in is detected, at least one preventative measure is taken.

Other characteristics and advantages of the invention appear on reading the following description of particular, nonlimiting embodiments of the invention.

BRIEF DESCRIPTION OF THE DRAWINGS

The invention can be better understood in the light of the following description given with reference to the accompanying figures, in which:

FIG. 1a is a diagrammatic plan view of a housing of a device in a first embodiment of the invention;

FIG. 1b is a diagrammatic section view of the FIG. 1a housing;

FIG. 2 shows an image acquired by a camera of the device shown in FIG. 1a;

FIG. 3 is a diagram showing the various steps of a method of verifying the integrity of the device shown in FIG. 1a; and FIG. 4 shows an image acquired by a camera of a device in a second embodiment of the invention.

DETAILED DESCRIPTION OF THE INVENTION

With reference to FIGS. 1a and 1b, in a first embodiment of the invention, the biometric inspection device, given overall reference 1, is specifically a device for inspecting fingers.

The device 1 has a closed housing 2 provided with an acquisition interface 3 including a surface on which a candidate for inspection is to place one or more fingers. By way of example, the acquisition interface 3 may be an acquisition window, or indeed an acquisition prism, that includes such a surface.

In known manner, the biometric inspection device 1 includes a calculation member such as a processor 4 and a memory 5 containing programs, with the processor 4 having access to the memory. The memory 5 contains in particular a finger-recognition computer program including instructions arranged to enable the processor 4 to inspect the candidate. In this example, the calculation member is arranged in the housing 2.

Furthermore, the device 1 includes lighting 6 for lighting the acquisition interface 3 together with an optical sensor 7 arranged to benefit from the lighting in order to capture at least one image of at least one of the figures of a candidate for biometric inspection placed on the acquisition interface 3. In the present example, both the lighting 6 and the optical sensor 7 are arranged inside the housing 2. By way of example, the lighting 6 is arranged facing the acquisition interface 3 on one or two main faces of the housing 2 and the optical sensor 7 is arranged on one of the side faces of the housing 2.

By way of example, the optical sensor 7 is a camera operating in the visible, and in corresponding manner the lighting 6 comprises one or more light-emitting diodes (LEDs) operating in the visible. As an alternative or in addition, the optical sensor 7 and/or the lighting 6 operate in other wavelength ranges, and by way of example in the infrared or the ultraviolet.

As can be seen more clearly in FIG. 2, the camera is arranged so that the images it acquires incorporate the acquisition interface 3 in full (i.e. the entire acquisition surface that is visible from inside the housing 2) together with an additional internal zone of the housing 2 outside the acquisition interface 3. Consequently, the images acquired by the camera incorporate not only information that can be used for inspecting a candidate, but also information about the internal structure of the housing 2, which structure would be damaged in the event of the housing 2 being opened fraudulently. It should be observed that said internal zone is not visible from outside the housing since it lies outside the acquisition interface.

The camera is thus configured to take an image that is larger than the area of the acquisition interface 3 that is visible inside the housing 2.

In the present example, the camera is such that the images it acquires cover the acquisition interface 3 in full and also at least a portion of the internal surroundings 8 of the acquisition interface 3.

It is thus possible to inspect at least a portion of the margin that fastens the acquisition interface 3 to the body of the housing 2 (i.e. the internal surroundings 8), which portion is the portion of the housing 2 that is the most likely to be opened in the event of the housing 2 being broken into.

Preferably, the camera is such that the images it acquires cover the acquisition interface 3 in full and also all of the internal surroundings 8 of the acquisition interface.

It is thus possible to inspect all of the margin that fastens the acquisition interface 3 to the body of the housing 2, which portion is the portion of the housing that is the most likely to be opened in the event of the housing 2 being broken into.

Optionally, the camera is such that the images it acquires cover additional internal surfaces of the housing 2 neighboring the internal margin of the acquisition interface 3.

It should be understood that the camera is such that in the images it acquires, the acquisition interface 3 is not necessarily centered in said images. It is thus possible, optionally, to have images with a top portion showing the fastener margin and a bottom portion showing the fastener margin plus an additional strip of the body of the housing 2.

Preferably, the internal zone of the housing 2 that is always present in the images acquired by the camera includes at least one integrity indicator 11. That is to say an indicator dedicated to acting in association with the camera to monitor the integrity of the housing 2, which indicator is provided inside the housing 2 in voluntary manner.

The integrity indicator 11 is preferably arranged on the internal surroundings 8 of the acquisition interface 3 and more preferably at the junction between said acquisition interface 3 and said internal surroundings 8.

In this example, the integrity indicator 11 is an integrity weld. The integrity weld may optionally contribute to fastening different elements of the housing 2 together. Nevertheless, its main purpose is to be easily identifiable in order to prove the integrity of the housing 2. Thus, the integrity weld is not in the form of a conventional weld. On the contrary, the integrity weld is shaped to have a particular pattern. FIG. 2 shows a weld having a zigzag shape. However, this pattern is not limiting, and the pattern could be any other pattern, e.g. an arabesque, an alphanumeric character, an acronym, a graphic, a geometrical shape . . . .

Thus, when the housing 2 is broken into, not only is the housing 2 damaged, but also the integrity weld is likewise damaged or even broken. It is thus easier to monitor whether there has been a break-in. Furthermore, if a person seeks to mask the break-in, any replacement of the integrity weld by a new weld will also be detected because the new weld will not present the particular pattern of the integrity weld.

The method of verifying the integrity of the device 1 is described below with reference to FIG. 3.

In the present example, each time the device 1 is started, the processor 2 launches the following steps:
  capturing 101 an image, even if a finger has not yet been placed on the acquisition interface 3, the image thus including an internal zone of the housing 2 outside the acquisition interface 3;
  comparing 102 the image with a reference image; and
  detecting whether or not the housing 2 has been broken into (e.g. by detecting whether the integrity indicator 11 is still present and does indeed form the reference pattern).

By way of example, the reference image may be acquired during manufacture of the device 1, or else the first time it is put into service. Optionally, this image may be refreshed at regular intervals in order to take account of natural wear of the housing 2, and specifically in this example of the integrity indicator 11.

If no break-in is detected, the device 1 is unlocked in order to perform biometric inspection of candidates in a step 103.

The biometric inspection method then takes place normally by performing the following steps:
  once a candidate for inspection has placed one or more fingers on the acquisition interface 3, capturing an image of said finger(s);
  extracting biometric data of the candidate from the image of said finger(s);

comparing the candidate's biometric data with the reference biometric data and deducing a corresponding similarity score therefrom;

validating or refusing recognition as a function of the value of the similarity score in comparison with a predetermined threshold value; and giving access to premises, information, . . . if recognition is validated, and possibly issuing a warning if recognition is refused.

In contrast, if a break-in is detected, at least one preventative measure may be put into place in a step 104, e.g. such as:

freezing all or some of the functions of the device 1, and in particular refusing any finger-recognition process;

deleting all or some of the data present in the device 1, such as deleting all or some of the memory 5 and in particular the reference image or the reference biometric data if they are present in said memory 5; and issuing a warning about the detected break-in (e.g. by transmitting a message to a remote operator, issuing an audible or visual alarm, . . . ).

With reference to FIG. 4, there follows a description of a second embodiment. This second embodiment is identical to the first embodiment with the difference that the integrity indicator 11 is not the result of welding but rather of stamping in a heading or staking operation.

Thus, one end of the integrity indicator 11 as visible in the images acquired by the camera is deformed by stamping, the end thus taking on a particular shape that is easily identifiable.

The integrity indicator 11 may optionally contribute to fastening different elements of the housing 2 together. For example, the integrity indicator 11 may be a fastener element (a rivet, a screw, a nut, . . . ) having its end deformed by stamping. In particular, the fastener element may contribute to fastening the acquisition interface 3 to the body of the housing 2.

Nevertheless, the main purpose of the integrity indicator 11 is to be easily identifiable in order to demonstrate the integrity of the housing 2. Thus, if it is a fastener element, it is not of conventional shape.

Thus, when the housing 2 is broken into, not only is the housing 2 damaged, but also the end of the integrity indicator is likewise damaged or even broken. It is thus easier to monitor whether there has been a break-in. Also, if a person seeks to mask the break-in, any replacement of the integrity indicator by another will likewise be detected because the new indicator will not have the particular pattern at its end.

Naturally, the invention is not limited to the embodiments described, but covers any variant coming within the ambit of the invention as defined by the claims. In particular, although above the biometric inspection involves recognizing one or more fingers, the biometric inspection could be of any other type, e.g. such as inspection of an eye or indeed of a face. The candidate could thus merely come close to the acquisition interface without applying a finger or anything else on said acquisition interface.

Although the optical sensor is a camera operating in the visible, the optical sensor could be of some other type, e.g. some other camera such as an infrared camera. Likewise, although above the image acquired by the optical sensor is a two-dimensional image, the acquired image could be a three-dimensional image. Also, the lighting and/or the optical sensor could, alternatively or in addition, operate in wavelength ranges other than the visible.

The calculation member may be other than a processor, and by way of example it could be a computer, a microcomputer, . . . .

Some or all of the various elements of the device described could be arranged outside the housing. For example, the lighting could be arranged outside the housing.

Concerning the integrity indicator, it could be other than as described above. The indicator could thus equally well be an element that is to be broken or irremediably damaged or an element that is to change state irremediably (e.g. an element that is sensitive to light, to temperature, to friction, . . . and having properties that are changed irremediably when the housing is opened; by way of example, opening the housing could cause the integrity indicator to change color irremediably). Naturally care should be taken to select an integrity indicator that can be modified irremediably (change of state and/or mechanical degradation) without any need to be powered for this purpose. Instead of being formed by a welding or stamping, the integrity indicator could, for example, be formed by soldering in a particular shape, by crimping with a particular shape, . . . . It would also be possible to have an integrity indicator in the form of a fastener element having one or more easily identifiable markings.

It is possible to do without an additional integrity indicator by using the optical sensor to monitor the internal structure of the housing. Protection against the device being sabotaged would then lie in comparing the internal structure of the housing between the acquired image and the reference image (e.g. the presence of cracks, of holes, of a missing fastener element, . . . ).

The housing should preferably be shaped so that in order to gain access to the inside of the housing it is necessary to open and/or modify the housing in the internal zone of the housing (situated outside the acquisition interface but monitored by the optical sensor). Redundancy could also be provided by monitoring both at least one integrity indicator and also the internal structure of the housing. Redundancy could equally well be provided by monitoring at least two integrity indicators simultaneously. For example, integrity indicators could be arranged at different locations in the zone that the optical sensor acquires outside the acquisition interface.

Although above the integrity of the device is verified each time the device is started (e.g. each time it is switched on and/or each time the device exits a standby mode . . . ), the step of verifying the integrity of the device could be performed differently, e.g. each time a biometric inspection is launched. For example, if a finger image is acquired, the integrity of the housing could be verified initially by comparing said image with the reference image, and only if the integrity of the housing is validated, would the biometric inspection method continue as normal.

The invention claimed is:

1. A biometric inspection device comprising a housing provided with an acquisition interface, the device including an optical sensor for acquiring at least one image of a portion of the body of a candidate for inspection appearing before the acquisition interface, wherein the optical sensor is configured so that said image also covers an internal zone of the housing situated outside the acquisition interface.

2. The device according to claim 1, wherein the acquisition interface is an acquisition prism.

3. The device according to claim 1, wherein the internal zone surrounds at least a portion of the acquisition interface.

4. The device according to claim 3, wherein the internal zone surrounds the acquisition interface entirely.

5. The device according to claim 1, wherein the internal zone includes at least a portion of a margin for fastening the acquisition interface to the housing.

6. The device according to claim 1, wherein the optical sensor is a camera.

7. The device according to claim 1, the device being a device for inspecting fingers.

8. The device according to claim 1, further including at least one integrity indicator for indicating the integrity of the housing.

9. The device according to claim 8, wherein the integrity indicator is arranged in the internal zone.

10. The device according to claim 8, wherein the integrity indicator forms a particular pattern and/or includes a particular pattern.

11. A biometric inspection device comprising a housing provided with an acquisition interface, the device including an optical sensor for acquiring at least one image of a portion of the body of a candidate for inspection appearing before the acquisition interface, the optical sensor being configured so that said image also covers an internal zone of the housing situated outside the acquisition interface, said internal zone including at least one integrity inductor for indicating the integrity of the housing, wherein the integrity indicator is an integrity weld and forms a particular pattern and/or includes a particular pattern.

12. The device according to claim 10, wherein the integrity indicator presents an end that is stamped.

13. A method of verifying the integrity of a device according claim 1, including the step of comparing a reference image with an image acquired by the optical sensor in order to check the integrity of the device.

14. The method according to claim 13, wherein an image for comparing with the reference image is acquired each time the device is started.

15. The method according to claim 13, wherein if a break-in is detected, at least one preventative measure is taken.

* * * * *